United States Patent [19]
Wickham

[11] Patent Number: 6,093,927
[45] Date of Patent: Jul. 25, 2000

[54] AUTOMATED PRECISION WAVELENGTH CONTROL FOR FIBER OPTIC BRAGG GRATING WRITING

[75] Inventor: Michael G. Wickham, Rancho Palos Verdes, Calif.

[73] Assignee: TRW Inc., Redondo Beach, Calif.

[21] Appl. No.: 08/871,420

[22] Filed: Jun. 9, 1997

[51] Int. Cl.[7] .................................................. G02B 6/10
[52] U.S. Cl. ................................ 250/227.23; 385/123
[58] Field of Search ...................... 250/227.14, 227.18, 250/227.23, 231.1; 385/123, 124, 129, 130, 37; 359/566, 570

[56] References Cited

U.S. PATENT DOCUMENTS

| | | | |
|---|---|---|---|
| 5,327,515 | 7/1994 | Anderson et al. | 385/123 |
| 5,388,173 | 2/1995 | Glenn | 385/123 |
| 5,563,967 | 10/1996 | Haake | 250/227.23 |

OTHER PUBLICATIONS

"Fiberoptic Sensors measure up for Smart Structures", Friebele et al., Laser Focus World, May 1994, pp. 165–169.

*Primary Examiner*—Stephone B. Allen
*Attorney, Agent, or Firm*—Michael S. Yatsko

[57] ABSTRACT

The present invention provides a computer controlled apparatus and method for producing high quality fiber optic Bragg gratings. According to the invention, the apparatus (10) preferably includes a laser (12) for generating an ultraviolet beam (18), a rotatable prism (32) disposed downstream of the laser (12) for receiving the beam (18) and an optical fiber (48) disposed adjacent a bottom edge (84) of the prism (32) for receiving a high fringe frequency interferrogram (86) formed by the prism (32). The prism (32) is coupled to a rotation stage (14) for rotating the prism (32) about a pre-selected pivot point (36) relative to the angle of incidence of the beam (18) to vary the Bragg wavelength at the fiber core.

20 Claims, 7 Drawing Sheets

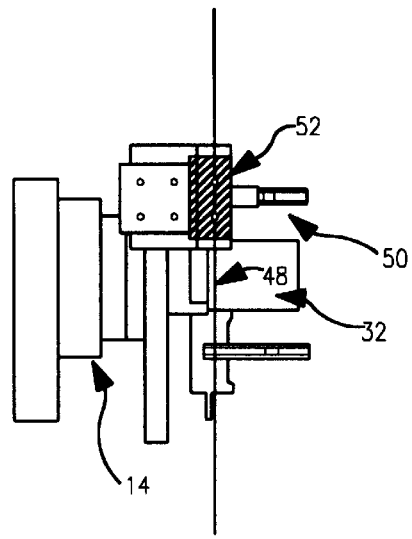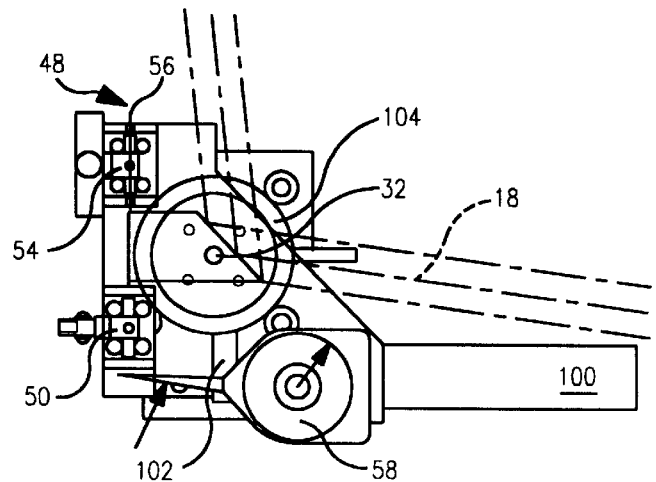
FIG. 3C          FIG. 3A
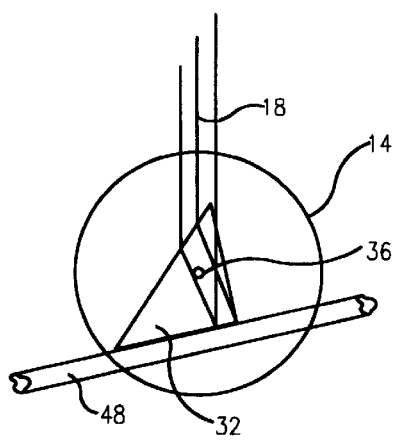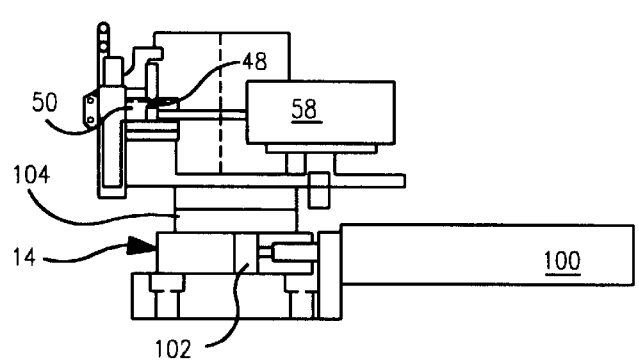
FIG. 2           FIG. 3B

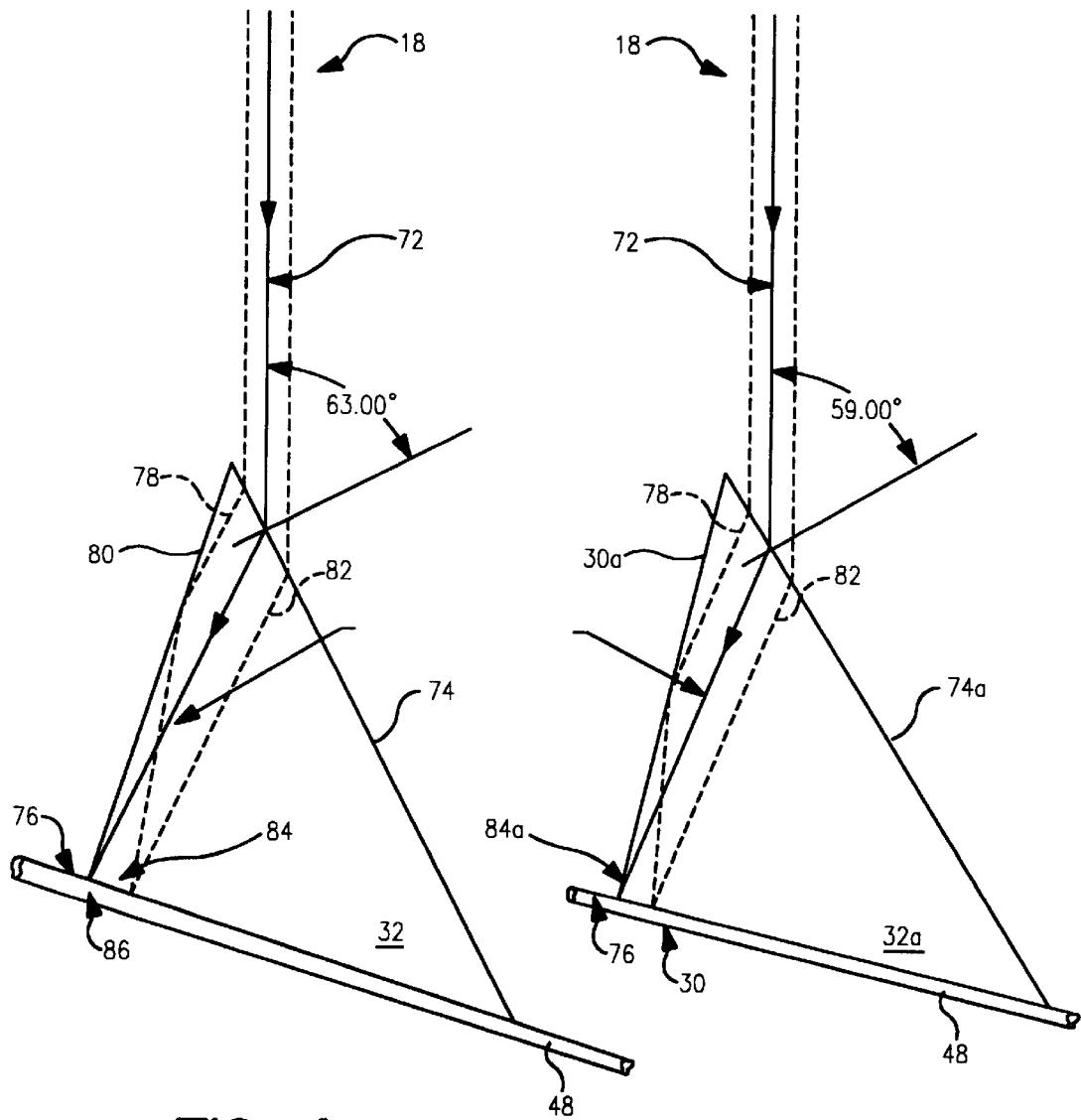

1

AUTOMATED PRECISION WAVELENGTH CONTROL FOR FIBER OPTIC BRAGG GRATING WRITING

BACKGROUND OF THE INVENTION

1. Technical Field

The present invention generally relates to Bragg gratings and, more particularly, to an apparatus and method for producing high quality fiber optic Bragg gratings with precise control of the Bragg center wavelength.

2. Discussion

Most fiber optic Bragg gratings are manufactured by exposing the core of a fiber to an intense, spatially modulated ultra violet (UV) beam of radiation. The UV light induces an increase in the index of refraction of the core material in the fiber optic. Thereafter, light launched down the core of the fiber is reflected only if the spatial modulation period ($\Lambda$) and the wavelength of the light ($\lambda$) satisfy the Bragg condition, $\lambda_B = 2n\Lambda$, where n is the mean index of refraction in the fiber core.

According to the prior art, precise positioning of the reflection wavelength center in fiber optic Bragg gratings requires tedious re-alignment of the optics. The production of holographic fringe patterns having appropriate fringe spacing requires precise positioning of the beam combining optics such as the prism and cylindrical lens in prism techniques and the beam splitter, combining mirrors and focusing lenses in open holographic techniques. This makes the production of fiber optic Bragg gratings time consuming and commercially impractical on a large scale basis. As such, there is a need in the art to provide an apparatus and method for routinely producing fiber optic Bragg gratings with precise control of the Bragg center wavelength.

SUMMARY OF THE INVENTION

The above and other objects are provided by a computer controlled apparatus and method for producing high quality fiber optic Bragg gratings. Preferably, the apparatus includes a laser for generating an ultraviolet beam, a rotatable prism disposed downstream of the laser for receiving the beam and an optical fiber disposed adjacent a bottom edge of the prism for receiving a high fringe frequency interferrogram formed by the prism. The prism is coupled to a rotation stage for rotating the prism about a pre-selected pivot point relative to the angle of incidence of the beam to vary the Bragg wavelength at the fiber core.

BRIEF DESCRIPTION OF THE DRAWINGS

In order to appreciate the manner in which the advantages and objects of the invention are obtained, a more particular description of the invention will be rendered by reference to specific embodiments thereof which are illustrated in the appended drawings. Understanding that these drawings only depict preferred embodiments of the present invention and are not therefore to be considered limiting in scope, the invention will be described and explained with additional specificity and detail through the use of the accompanying drawings in which:

FIG. 2 is a more detailed view of the prism and rotation stage of FIG. 1 taken along line 2—2;

FIGS. 3a–3c are schematic illustrations of the fiber optic mount and rotation stage of FIG. 1;

FIG. 4 is a schematic illustration of a prism and beam path for writing a Bragg grating at 1550 nm in accordance with the present invention;

FIG. 5 is a schematic illustration of a prism and beam path for writing a Bragg grating at 1300 nm in accordance with the present invention;

DETAILED DESCRIPTION OF THE PREFERRED EMBODIMENTS

Figure 1:
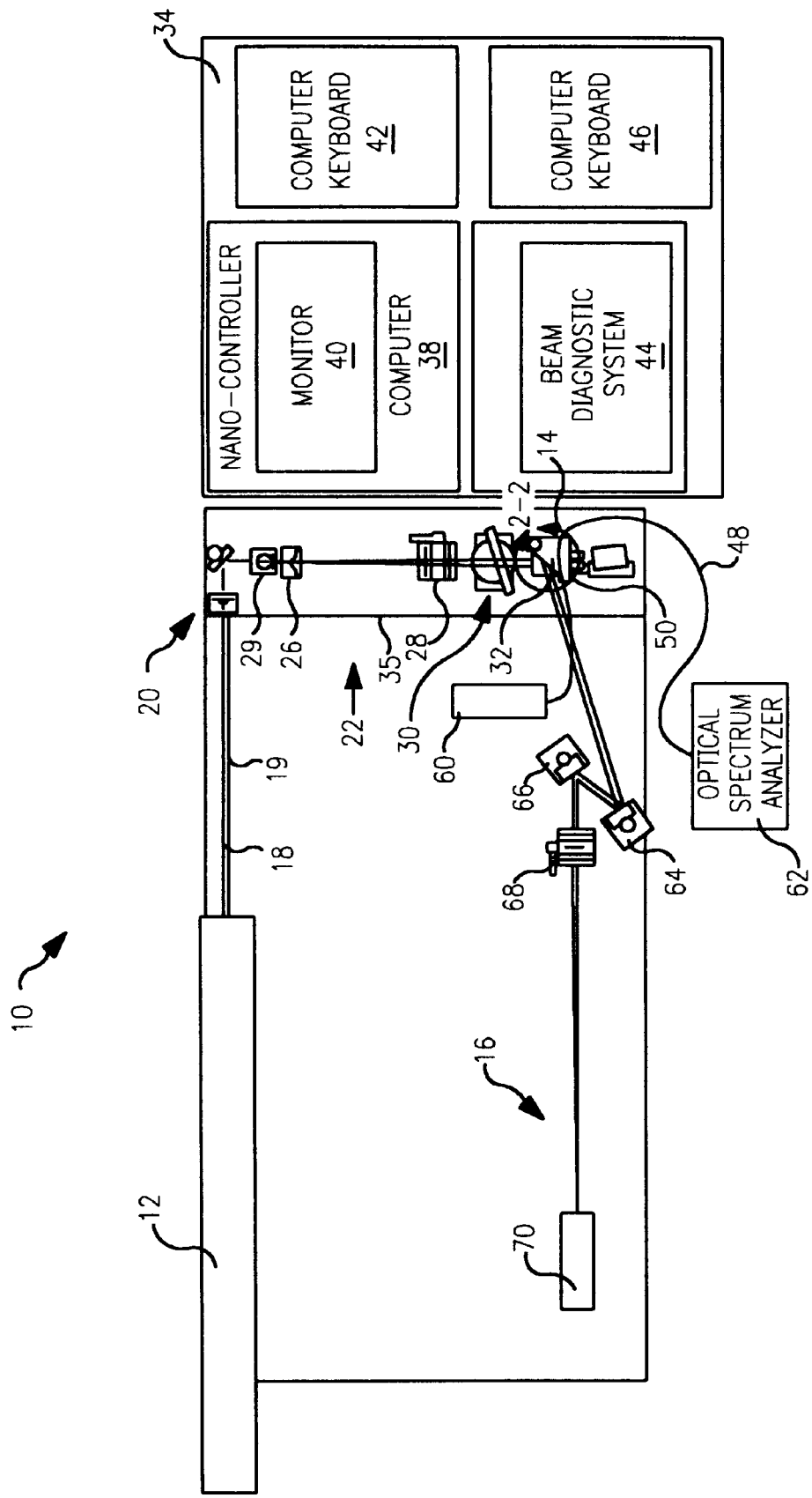
FIG. 1 is a schematic top view of an apparatus for producing fiber optic Bragg gratings with precise control of the Bragg center wavelength in accordance with the present invention.

Turning now to the drawings, FIG. 1 illustrates an apparatus for producing fiber optic Bragg gratings in accordance with the present invention generally at 10. The apparatus 10 generally includes a laser 12, rotation stage 14, and far field camera 16.

The laser 12 is preferably a commercially available continuous wave (CW) laser suitable for generating an ultraviolet beam 18. Even more preferably, the laser 12 is an Argon ion laser including a Beta-Barium Borate (BBO) crystal within the laser cavity providing frequency doubled output. For instance, the laser 12 may produce a 100 mW CW beam 18 having a 244 nm wavelength with long coherence length and high beam quality. A tube 19 is used to enclose the beam 18 to prevent open air current from causing wave front distortion.

A half waveplate 20 optically communicates with the laser 12 for rotating the polarization of the beam 18 by 90°. Rotating the polarity of the beam 18 is necessary to form the correct high frequency fringe pattern described below. A galilean telescope 22 is disposed downstream of the waveplate 20 for receiving the beam 18.

The galilean telescope 22 includes a negative lens 24 for beam expansion, an aperture 26 to isolate the central beam from the laser 12 and a positive lens 28 to collimate the beam to the desired diameter. Preferably, a 1.6 cm diameter beam is used herein. A cylindrical lens 30 is disposed in light receiving relation to the galilean telescope 22 for forming a line focus from the beam 18. A cylindrical lens including a 15 cm focal length has been found particularly well suited for this purpose.

A prism 32 is coupled to the rotation stage 14 such that it receives the line focus from the cylindrical lens 30. Preferably, the prism is a 2 inch-type prism made of UV grade fused silica. The rotation stage 14 communicates with a nano-controller 34 for precisely rotating the prism 32 relative to the incident angle of the beam 18. By rotating the prism 32, the Bragg wavelength may be varied. A plastic enclosure 35 houses the optical train for minimizing wave front distribution.

Referring momentarily to FIG. 2, a pivot point 36 about which the prism 32 rotates ensures proper alignment of the line focus with the fiber core when the prism 32 is rotated to change the grating spacing. As described in greater detail below, automated manufacturing of fiber optic Bragg gratings is enhanced by appropriately selecting the pivot point 36. Through proper selection, the pivot point 36 alleviates the need for translating the prism 32 when changing to a new Bragg wavelength.

Referring again to FIG. 1, the nano-controller 34 includes a computer or central processing unit (CPU) 38, monitor 40, and keyboard 42. The CPU 38 also communicates with a beam diagnostic system 44 including a dedicated keyboard 46. As described in greater detail below, the nano-controller 34 supplies the drive signal for adjusting the angle of the prism 32. This adjusting is controlled by the CPU 38.

An optical fiber 48 is secured adjacent the prism 32 by a fiber mount 50. As best seen in FIGS. 3a–3c, the fiber 48 is held under tension on a three axis translation stage 52 which preferably has one micron adjustment resolution. This level of adjustment is preferable since the core diameter of the fiber 48 may be as small as 2 to 5 microns. A final translation stage 54 moves one end 56 of the fiber 48 up and down to assure that the line foci from the two paths in the prism 32 coincide with the fiber core. Final alignment is provided by adjusting the single slit diffraction patterns created by the two line foci diffracting off the fiber core.

The tension applied to the fiber 48 is set by monitoring the value displayed on a gauge 58 mounted to the fiber mount 50. A shift in wavelength is realized for the specific tension applied to the fiber 48. This known amount is taken into account when making the wavelength positioning setting. It should be noted that one tip of the 2" fused silica prism 32 may be cut off to yield a 1" face. This minimizes the droop in the fiber 48 under tension.

Referring now also to FIG. 1, the nano-controller 34 supplies the drive signal to the nano-drive 100 which moves the moment arm 102 of the rotation drive 104 to adjust the angle of the prism 32. The nano-drive 100 is controlled by the CPU 38 which steps the nano-drive 100 to provide micro-radian angular intervals. The specific angle of the prism 32 is to set to the angle required for the Bragg wavelength desired as described below.

As seen in FIG. 1, the fiber optic 48 extends between a light emitting diode (LED) 60 and an optical spectrum analyzer 62. In this way, radiation received by the fiber optic 48 via the prism 32 may be observed at the LED 60. Also, the transmission spectrum may be monitored on the analyzer 62 while the grating is being formed to verify the wavelength and reflectivity of the Bragg grating. As such, any desired reflectivity can be achieved.

First and second mirrors 64 and 66 optically communicate with the prism 32 to receive and reflect radiation therefrom. The first and second mirrors 64, 66 direct the radiation to the far field camera 16. Preferably, the far field camera 16 includes a far field lens 68 and UV sensitive charged coupled device (CCD) camera 70. The CCD camera 70 is used during alignment to set the prism angle. The image from the CCD camera 70 is input to the beam diagnostic system 44 which provides drive information to the nano-controller 34 to achieve the predetermined angle.

Preferably, the far field lens 68 has a one meter focal length for focusing the radiation onto the camera 70. As such, the far field camera 16 is sensitive to 18.5 nm of tuning range without adjustment. Additionally, a greater capture range may be achieved by moving the camera 70. Preferably, this is accomplished without losing calibration by determining the desired wavelength prior to adjustment.

Turning now to FIGS. 4 and 5, the prism 32 is illustrated in a first position appropriate for writing Bragg gratings at 1300 nm and a second position appropriate for writing Bragg gratings at 1550 nm. These wavelengths are of particular interest for the communications industry. However, it should be noted that the present invention is also suitable for writing Bragg gratings within other wavelength ranges. Additionally, it should be understood that the specific wavelengths described within this specification represent regions of wavelengths and therefore is not limited to the specific wavelength stated. As mentioned above, the prism 32 may be moved to new Bragg wavelength positions by rotating the prism 32 about a preselected pivot point 36. However, if the pivot point 36 is incorrectly selected, the prism 32 must also be translated to maintain optimum alignment.

As shown in FIG. 4, the prism 32 is in the proper position for writing a Bragg grating at 1550 nm. As can be seen, the UV writing beam center axis 72 is incident upon the hypotenuse 74 of the prism 32. The specific relation between the incident angle θ of the UV beam 18 to the hypotenuse 74 of the prism 32 is given by the following equation:

$$\lambda B := n0 \cdot \frac{\lambda uv}{\left( n \cdot \sin\left( \frac{1}{4} \cdot \pi - a\sin\left( \frac{\sin\left( \frac{1}{180} \Theta i \cdot \pi \right)}{n} \right) \right) \right)}$$

where:
nO=the index of refraction of the fiber core at the Bragg wavelength;
n=the index of refraction of the prism at the UV wavelength (244 nm);
θ:=the incident angle;
λuv=the wavelength of the UV light; and
λB=the Bragg wavelength.

In the illustrated embodiment, the UV beam 18 refracts upon entering the prism 32 and the center axis 72 travels to the apex 76 of the prism 32. The left portion 78 of the beam 18 reflects, by total internal reflection, off the side 80 of the prism 32 while the right portion 82 of the beam 18 travels directly to the bottom edge 84 of the prism 32. At the bottom edge 84, the right portion 82 of the beam 18 overlaps the left portion 78 of the beam 18 creating the high-fringe frequency interferrogram 86 required for writing the Bragg grating.

It can be appreciated that when the center axis 72 of the beam 18 does not intersect the apex 76 of the prism 32, the beam overlap is not symmetric. That is, the left portion 78 or right portion 82 of the beam 18 does not have the same spatial extent as the other half 82, 78 of the beam 18. A symmetric overlap is assured by rotating the prism 32 about the optimum pivot point 36 to change the Bragg wavelength. A translation of the prism 32 is required to achieve a symmetric overlap of the left portion 78 and right portion 82 of the UV writing beam 18 if the rotation is performed about an incorrect pivot point 36.

FIG. 5 illustrates the prism 32a located relative to a beam path for writing a Bragg grating at 1300 nm. As can be seen, the center axis 72 of the UV writing beam 18 is incident upon the hypotenuse 74a of the prism 32a. Additionally, the left portion 78 of the beam 18 reflects off the side 80a of the prism 32a and overlaps with the right portion 82 of the beam 18 at the bottom edge 84a of the prism 32a creating the required high fringe frequency interferrogram 86.

Figure 6:
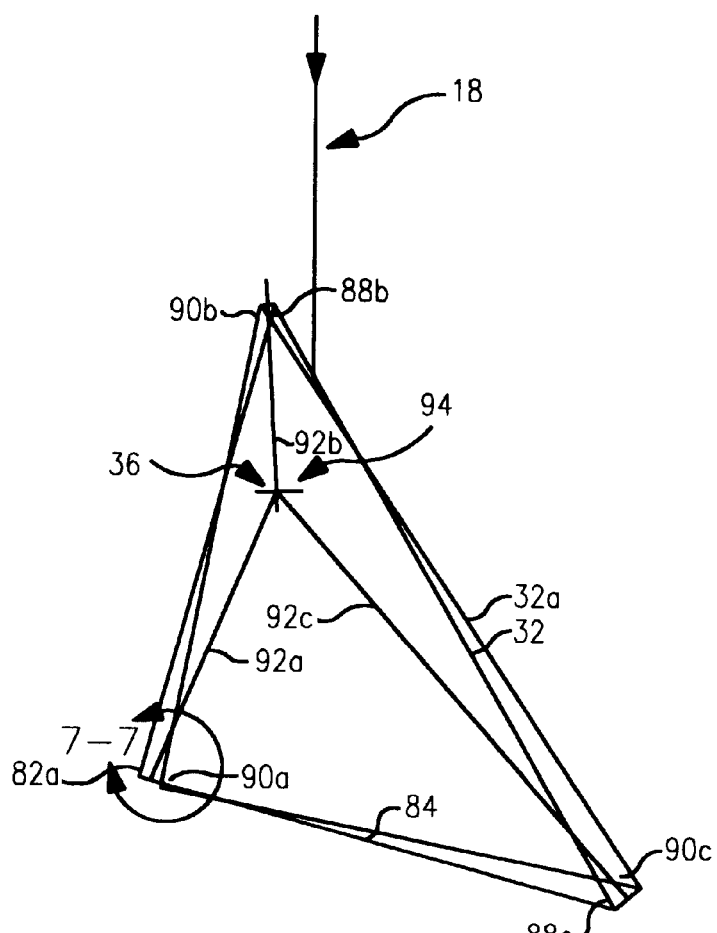
FIG. 6 is a schematic illustration of the prism and beam path of FIG. 4 superimposed on the prism and beam path of FIG. 5 including a coincident UV beam center path and an optimal pivot point.

Referring now to FIG. 6, the prism 32 and ray path of FIG. 4 is superimposed over the prism 32a and ray path of FIG.

Figure 7:
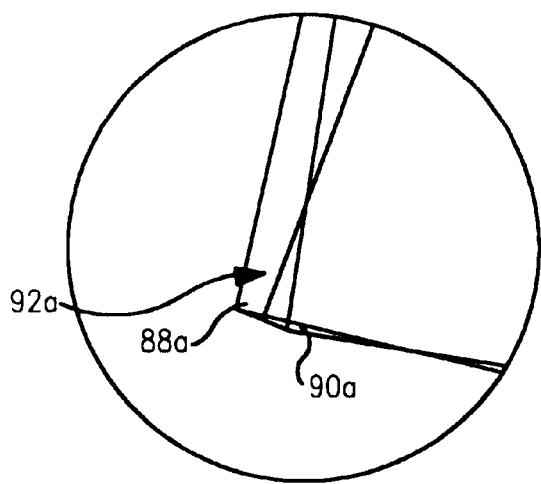
FIG. 7 is a more detailed view of a perpendicular bisector of FIG. 6 taken along line 7—7.

5 such that the incident UV beam 18 is common. This illustration also represents the pivot point 36 about which the prism 32 may be rotated for writing Bragg gratings at both 1300 nm and 1550 nm. To accomplish this, the three corners 88a, 88b, 88c of the prism 32 are connected graphically to the corresponding corners 90a, 90b, 90c of the other prism 32a. A perpendicular bisector 92a, 92b, 92c of each of the connecting lines extends towards the interior of the prism 32. The intersection 94 of the three perpendicular bisectors 92a, 92b, 92c locates the optimum pivot point 36. A more detailed view of the perpendicular bisector 92a is shown in FIG. 7.

The prism 32 may be rotated about the pivot point 36 for selective positioning to the 1300 nm Bragg writing location or the 1550 nm Bragg writing location. The axial position along the UV beam 18 is chosen such that the path length difference within the prism 32 for the two positions is accommodated so that the cylindrical focus of the beam 18 remains just outside of the bottom edge 84 of the prism 32. This ensures that the cylindrical focus of the beam 18 contacts the core of the fiber 48 (FIG. 1).

Figure 8:
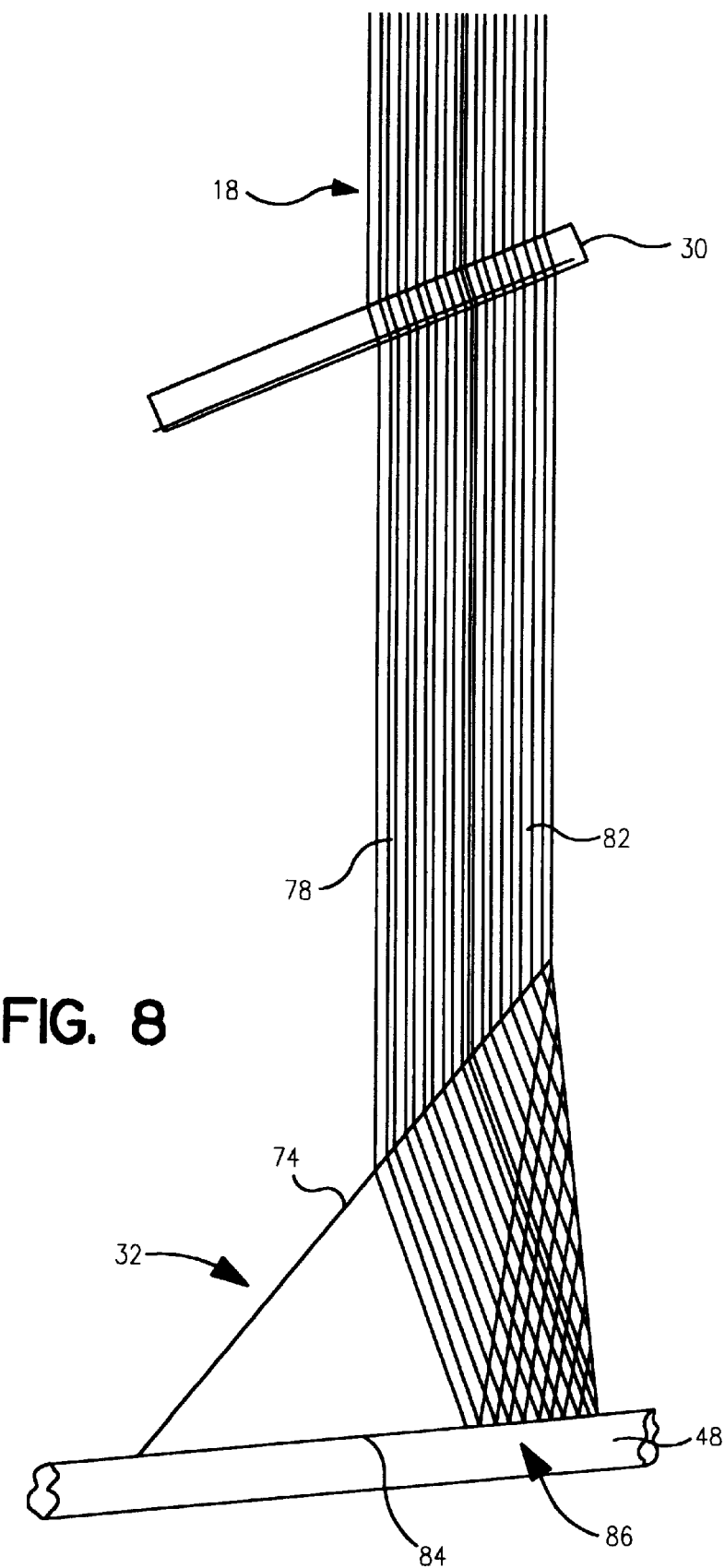
FIG. 8 is a schematic illustration of several ray paths of the incident UV beam overlapping to form the high frequency interferrogram.

Referring now to FIG. 8, the cylindrical lens 30 and prism 32 are shown in greater detail. In order to assure proper alignment of the line focus with the fiber 48, it may be necessary to rotate the cylindrical lens 30 relative to the beam 18. To accomplish this, the cylindrical lens 30 is rotated to be non-normal to the beam 18 to cause the line focus to be parallel to the hypotenuse 74 of the prism 32 and coincident with the fiber 48. This assures properly matched interference at the bottom edge 84 of the prism 32 which produces the high spatial frequency interferrogram 86 at the core of the fiber 48 and forms the spatially modulated UV light necessary for creating the fiber optic Bragg grating.

Figure 9:
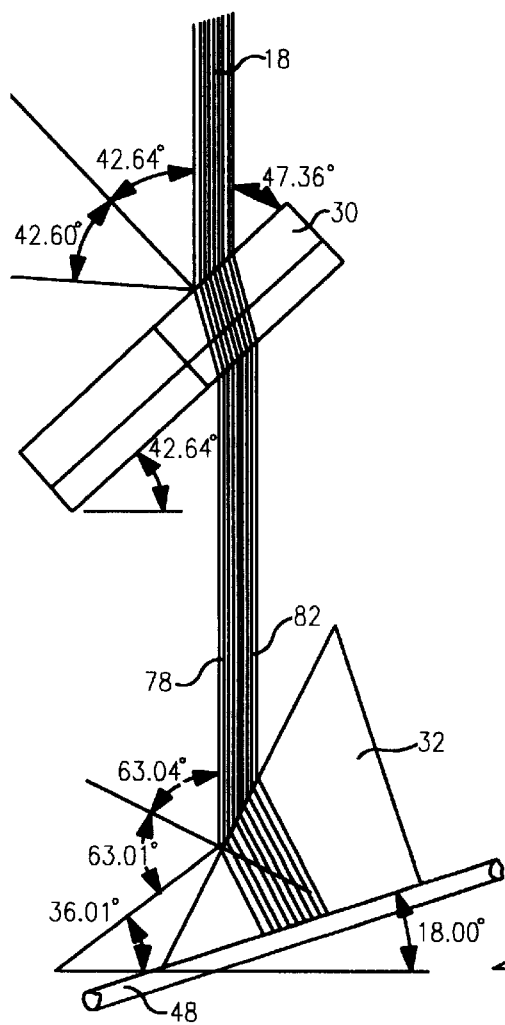
FIG. 9 is a schematic view of a cylindrical lens angle and corresponding prism angle for a 1500 nm Bragg wavelength.
Figure 10:
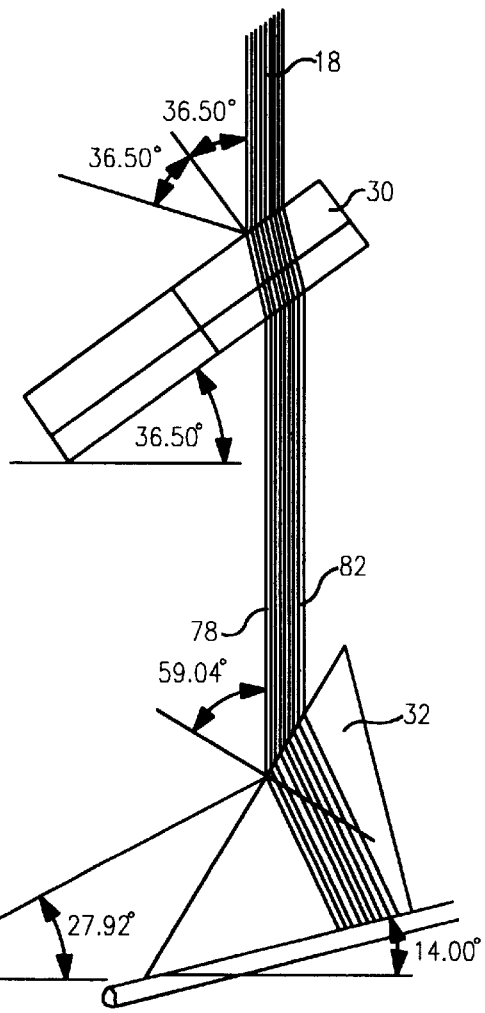
FIG. 10 is a schematic view of a cylindrical lens angle and corresponding prism angle for a 1300 nm Bragg wavelength.

Turning to FIGS. 9 and 10, the precise angle of the cylindrical lens 30 for ensuring proper interference is determined through a ray tracing program. In FIG. 9, the angles for the prism 32 and cylindrical lens 30 for a 1315 nm Bragg wavelength are illustrated. Similarly, the angles for the prism 32 and cylindrical lens 30 for a 1546 nm Bragg wavelength are illustrated in FIG. 10. It should be noted, however, that due to the rotation of the cylindrical lens 30, it may be necessary to translate the rotation stage 14 (FIG. 1) a known, small amount to optimize the overlap of the left portion 78 and right portion 82 of the UV beam 18.

As illustrated in FIGS. 6–10, rotation of the prism 32 about the pivot point 36 is valid when writing for Bragg gratings in the regions of 1550 nm and 1300 nm. However, if the cylindrical lens 30 is also rotated to an optical angle when changing wavelength regions from 1300 nm to 1550 nm, the beam overlap must be made ideal by translating the prism 32 perpendicularly to the direction of the UV beam 18. In practice, however, a compromise position of the cylindrical lens 30 is chosen, that is mid-way between the ideal positions for writing gratings at 1300 nm and 1550 nm. In this way, no translation is required over the entire 1300 nm to 1550 nm region. The compromise position of the cylindrical lens 30 has the added advantage of softening the sharp, half-gaussian profile typical of the prism method. This softer profile results in superior sidelobe suppression.

Figure 11:
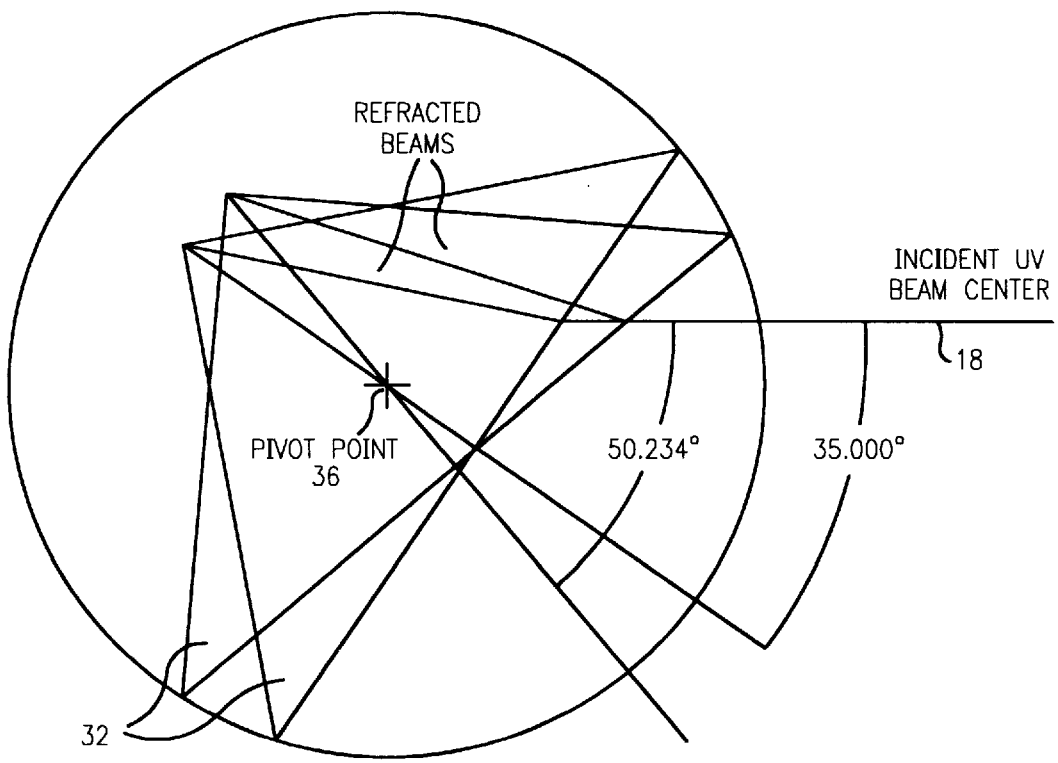
FIG. 11 is a schematic view of an optimal prism pivot point for the incident angles shown.

Thus, as shown in FIG. 11, the pivot point 36 for the prism 32 remains valid when changing from one wavelength region to another, for example, 1300 nm to 1500 nm. In the illustrated embodiment, the location of the pivot point 36 is valid for the indicated incident angles. Accordingly, high quality Bragg gratings may be routinely manufactured with precise control of the Bragg center wavelength. Furthermore, the tedious re-alignment of the apparatus elements as required in prior art systems for writing at different wavelengths is alleviated.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification, and following claims.

What is claimed is:

1. An apparatus for writing fiber optic Bragg gratings over a range of Bragg wavelengths, said apparatus comprising:
   a laser for generating an ultraviolet beam;
   a prism disposed downstream of said laser such that said beam is incident on a hypotenuse of said prism;
   a cylindrical lens interposed between said laser and said prism for aligning a line focus of said beam parallel with said hypotenuse of said prism;
   a rotation stage coupled to said prism for rotating said prism about a pre-selected pivot point relative to an angle of incidence of said beam to vary said Bragg wavelength within said range; and
   an optical fiber disposed adjacent a bottom edge of said prism for receiving a high fringe frequency interferrogram formed by said prism from said beam on a core portion thereof, said high fringe frequency interferrogram writing said Bragg grating thereon.

2. The apparatus of claim 1 further comprising:
   a far field camera optically communicating with said prism for monitoring said angle of incidence.

3. The apparatus of claim 1 further comprising:
   a fiber mount for securing said fiber adjacent said bottom edge of said prism, said fiber mount including a three axis translation stage for adjusting a position of said core relative to said line focus.

4. The apparatus of claim 1 further comprising:
   a half waveplate interposed between said laser and said cylindrical lens for rotating a polarization of said beam by 90°.

5. The apparatus of claim 1 further comprising:
   a galilean telescope interposed between said laser and said cylindrical lens for changing a diameter of said beam to a predetermined size.

6. The apparatus of claim 1 further comprising:
   an optical spectrum analyzer diode coupled to a first end of said optical fiber for monitoring a wavelength and reflectively of said core while said Bragg grating is being formed.

7. The apparatus of claim 1 further comprising:
   a nano-controller operably coupled to said rotation stage for precisely rotating said prism relative to said beam.

8. The apparatus of claim 1 wherein said pivot point is located at a position about which said prism may be rotated between a first orientation for writing Bragg gratings at 1550 nm and a second orientation for writing Bragg gratings at 1300 nm.

9. The apparatus of claim 1 wherein said laser further comprises an Argon ion laser including a Beta-Barium Borate crystal for providing frequency doubled output.

10. The apparatus of claim 1 wherein said beam further comprises a 100mW continuous wave beam at a 244 nm wavelength.

11. The apparatus of claim 1 wherein said prism further comprises a two inch type fused silica prism having one tip removed to yield a one inch face.

12. The apparatus of claim 1 wherein said cylindrical lens further comprises a cylindrical lens having 15cm focal length.

13. The apparatus of claim 2 wherein said far field camera further comprises:
   a far field lens having a one meter focal length; and
   an ultraviolet light sensitive charged coupled device camera for receiving radiation focused by said far field lens.

14. The apparatus of claim 3 wherein said fiber mount further comprises a final translation stage for moving one end of said fiber vertically with respect to said prism to align said line focus with said core of said fiber.

15. The apparatus of claim 3 wherein said fiber mount further comprises a tensioning member for shifting said Bragg wavelength according to a tension applied to said fiber.

16. The apparatus of claim 5 wherein said galilean telescope further comprises:
   a beam spreader for expanding a diameter of said beam; and
   a collimating lens for maintaining said beam at a preselected diameter.

17. The apparatus of claim 16 wherein said preselected diameter is equal to 1.6 cm.

18. The apparatus of claim 7 wherein said nano-controller further comprises a computer operably coupled to a beam diagnostic system.

19. A method of writing fiber optic Bragg gratings over a range of Bragg wavelengths comprising the steps of:
   selecting a laser for generating an ultraviolet beam;
   positioning a prism downstream of said laser such that said beam is incident on a hypotenuse of said prism;
   interposing a cylindrical lens between said laser and said prism for aligning a line focus of said beam parallel with said hypotenuse of said prism;
   coupling a rotation stage to said prism for rotating said prism about a pre-selected pivot point relative to an angle of incidence of said beam to vary said Bragg wavelength within said range;
   securing an optical fiber adjacent a bottom edge of said prism for receiving a high fringe frequency interferrogram formed by said prism from said beam on a core portion thereof, said high fringe frequency interferrogram writing said Bragg grating thereon; and
   positioning a far field camera in radiation receiving relation to said prism for aligning said line focus on said core portion of said fiber.

20. The method of claim 19 further comprising:
   providing a fiber mount for securing said fiber adjacent said bottom edge of said prism, said fiber mount including a three axis translation stage for adjusting a position of said core relative to said line focus.

* * * * *